March 28, 1967   J. E. P. BOULAIS ET AL   3,310,983
HOT BEARING ALARM APPARATUS
Filed March 4, 1965
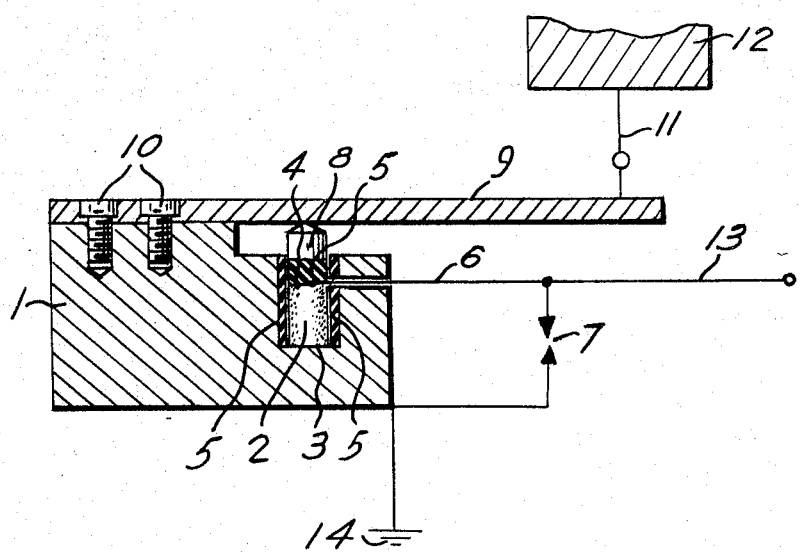
INVENTORS
William George RICHARDSON
Robert Albert TANGUAY
Jean Edouard Paul BOULAIS
Louis Georges DESROCHERS
AGENT

United States Patent Office 3,310,983
Patented Mar. 28, 1967

3,310,983
HOT BEARING ALARM APPARATUS
Jean Edouard Paul Boulais, Louis Georges Desrochers, and William George Richardson, Brownsburg, Quebec, and Robert Albert Tanguay, Montreal, Quebec, Canada, assignors to Canadian Industries Limited, Montreal, Quebec, Canada, a corporation of Canada
Filed Mar. 4, 1965, Ser. No. 437,032
Claims priority, application Great Britain, Mar. 26, 1964, 13,052/64
7 Claims. (Cl. 73—358)

This invention relates to a method and apparatus for detecting overheated bearings, particularly overheated journal bearings, on railways cars. More particularly, this invention relates to a novel alarm apparatus for detecting the presence of such overheated bearings at a remote location.

The railway industry has long searched for an inexpensive, simple and sure means of detecting the presence of abnormally hot journal bearings on the cars of a moving train since such hot bearings may damage journals and housings. Hot railway car bearings have in the past resulted in broken car axles followed by derailment of the car, with consequent high cost in property damage and frequent injury to train crews.

Many examples may be found in the prior art of methods for detecting overheated journal bearings. For example, Brown et al, in U.S. Patent No. 3,016,457, provide a detecting means at a fixed location along a track, which detector is responsive to high frequency sound vibrations generated by the rotation of a shaft or journal in a dry bearing. Halstead, in U.S. Patent No. 3,117,301, provides an electrically charged circuit and a plurality of thermally responsive electric switches which, under the influence of heat generated by a hot bearing, operate to produce an alarm signal. Bennett, in U.S. Patent No. 2,818,732, contemplates the installation of resonant circuits and the use of a remote transmitter and receiver to monitor the temperature of wheels and bearings at selected points along a track. Baughman, in U.S. Patent No. 2,385,487, provides on each rail car a Wheatstone bridge circuit which is electrically balanced when all bearings are at about the same temperature, but upon overheating of a bearing, a resistor associated with the circuit upsets the electrical balance and produces an alarm. Newall, in U.S. Patent No. 2,420,969, provides a similar Wheatstone bridge circuit. Fritzinger, in U.S. Patent No. 2,552,165, provides a magneto which is rendered operable in the presence of a hot bearing, which magneto is capable of generating high tension current which, in turn, is converted to a radio frequency signal and transmitted to a receiver. Pelino et al, in U.S. Patent No. 2,963,575, provides a heat-responsive cell or element mounted alongside a section of track.

All of these devices have suffered from one or more disadvantages which have rendered them impractical for use. Some, for example, require the expenditure of large sums of money for installation. Some others, because of the delicate nature of their composition or construction, are not suitable for use under conditions normally encountered in rail transportation. Yet others, to ensure operativeness and reliability, would require extensive inspection and maintenance service. None of the devices disclosed heretofore has proven acceptable to the industry for the purposes claimed.

It is an object of the present invention to provide a hot bearing detector method and apparatus, especially for use on railway cars, which may be simply and economically installed and operated.

A further object of this invention is to provide a hot bearing detector which is resistant to damage and deterioration over long periods of use.

A still further object of the invention is to provide a hot bearing detector which requires little or no maintenance in normal use.

These and other objects of the invention will appear hereinafter.

The improved hot bearing detector apparatus of the invention comprises essentially, in combination, a grounded synthetic piezoelectric crystal transducer capable of transforming mechanical energy into electrical energy upon the application of repetitive pressure thereto; a heat conductive actuating means capable of vibration or pulsation at a characteristic frequency when excited by mechanical motion, said means being in indirect heat conductive contact with said bearing and being adapted to apply repetitive pressure upon said crystal; a fusible retaining means adapted to hold said vibrating or pulsating means in a stationary position and in direct contact with said bearing in heat conductive relationship; a radio frequency energy generating means in contact with said crystal; a radio frequency signal transmitting means in contact with said generating means; and a radio frequency signal receiving means in contact with said transmitting means.

One embodiment of the hot bearing detector apparatus will be more fully understood by reference to the accompanying diagrammatic drawing wherein is shown a steel block 1 in which is embedded piezoelectric crystal transducer 2. Face 3 of crystal 2 is in electrical contact with block 1 and through block 1 with adjacent bearing axle wheel and track represented by 14. Face 4 of crystal 2 is insulated by means of non-conductive material 5. A wire 6 is attached to face 4 of crystal 2 and terminates at spark gap 7. Face 4 of crystal 2 supports a piston part 8 which acts as a vibration transmission means and a pivot for vibration lever 9. Lever 9 is secured to block 1 by means of screws 10. Lever 9 is held in a non-vibrating, rigid position by means of low-melting-point wire 11 attached to, for example, adjacent journal structure 12. Antenna wire or rod 13 is provided as an extension of wire 6.

In typical operation, when a hot bearing develops, heat from the overheated bearing is conducted through block 1 and lever 9 and through adjacent journal structure 12 to reach low melting point wire 11. Wire 11 is caused to fuse and separate by the conducted heat, thereby releasing lever 9 which becomes free to vibrate. Mechanical movement and vibration of, for example, a railway car or an eccentricity of the wheel axle causes lever 9 to vibrate at its own predetermined resonant frequency. The frequency of vibration of lever 9 is dependent on the length, rigidity and mass of the lever. The vibration of lever 9 is transmitted as an amplified pressure pulse through piston piece 8 to piezoelectric crystal 2 which, in turn, generates a high voltage pulse. This high voltage pulse carried by conductor 6 jumps the electrical spark gap 7 generating a high frequency oscillation of several megacycles. The high frequency energy is produced at gap 7 in pulses corresponding to the frequency of oscillation of lever 9. Face 4 of crystal 2 and conductor 6 on the live side of spark gap 7 are connected to antenna 13 a few feet long which radiates the modulated electrical energy. The radiated energy may then be picked up by a simple radio receiver located, for example, in the caboose or locomotive of a railway train or alternatively by radio receivers located at selected distances along the right of way. The radio receiver may be selectively tuned and accept only those pulses having the characteristics of a particular lever/crystal/spark gap combination. All other background noises are thereby rejected.

The block and vibrating lever of the apparatus of the invention may be of any suitable metal capable of high strength and good heat conduction; however, mild steel is preferred for this purpose.

The synthetic piezoelectric crystal transducer is preferably a barium titanate crystal of about ⅜ inch diameter by about ¾ inch long but may be of any other convenient shape and size. Other synthetic piezoelectric crystals such as lead zirconate or lead titanate may be used or, alternatively, a natural quartz crystal may be employed although these may be less efficient than the preferred barium titanate crystal. Such crystals, upon the application of vibrational or pulsating mechanical pressure, can generate a voltage in excess of 20,000 volts which voltage, when transmitted as a modulated radio frequency signal, will carry the full length of a railway train.

The vibrating lever retaining wire may be any strong, heat-conductive metal wire, which wire is held in position by means of, for example, metal solder or a fusible link. Such metal solder or fusible link must be capable of melting and freeing the vibrating lever at a temperature below that at which bearing or journal damage will occur yet above that temperature encountered in normal, safe operating conditions.

The spark gap may be created by means of two metal pointed needles, separated a measured distance corresponding to the available voltage and enclosed in a sealed electrically non-conductive material like polymethyl methacrylate, polythene or nylon.

The antenna may be a wire or rod of length of about two feet comprised of copper or alloys thereof or other similar material well known in the art.

The crystal insulating material may be any suitable material of high dielectric value. However, in the interest of strength, durability, and resistance to exposure and heat, materials such as nylon or polythene, are preferred.

In yet another embodiment of the hot bearing detector apparatus of this invention, the railway tracks may be used as a transmission line to carry the radio frequency signal from the piezoelectric crystal to a receiver instead of a system of antennas as described heretofore. Such an arrangement may simplify the construction and installation of the apparatus by eliminating portions of the wiring circuit. Where railway tracks are used as signal transmission lines it is preferred that pressure on the crystal be applied by a percussion mass, for example, a spring-loaded punch device which can be operated in sequence with, for example, an eccentric on the rotating axle of the rail car. Such a punch device with the associated piezoelectric crystal may be embedded in the journal bearing where the spring-loaded punch is held in a non-operative position by means of a portion of metal solder or a fusible link. In the event the journal bearing temperature exceeds an upper temperature limit, the retaining fusible link permits the spring-loaded punch to be released. The spring actuated stroke of the punch operates to accelerate a mass which contacts a metal shoulder adjacent to the piezoelectric crystal. This high pressure, short period impulse propogates to the piezoelectric crystal which, in turn, produces a high voltage pulsating signal which is transmitted through the rail car wheels and thence to the track. A suitably tuned signal receiver in contact with the track at, for example, a remote location or in a locomotive may be employed to pick up the characteristic pulsating signal generated by the piezoelectric crystal. Where such a signal is transmitted to the tracks it is preferred that a low frequency signal be employed since transmission distance and signal strength may be reduced with high frequency transmission. The frequency of such a system may be simply determined by the distributed capacitance and inductance of the circuit.

The following example illustrates the improved apparatus and method of this invention but the latter is in no manner to be limited in scope to the embodiments enclosed.

*Example*

An apparatus comprising a vibrating lever and an associated piezoelectric crystal, spark gap and antenna wire as shown in FIGURE 1 of the drawing was clamped in a rigid position. Upon release of a lever retaining means, the lever was vibrated manually at its own resonant frequency thereby exciting the piezoelectric crystal which in turn produced a high voltage pulse, which pulse generated a radio frequency signal at the spark gap. The radio frequency signal transmitted by means of the antenna wire was picked up by an isolated radio receiver at a remote location in the form of a regularly pulsating sound. The output signal of the system was measured by means of an oscilloscope and a peak voltage of 15,000 volts oscillating at around 5 megacycles was recorded.

The hot bearing detector method and apparatus of the present invention offer particular advantages over existing or earlier disclosed systems. The piezoelectric crystal is a strong, efficient and reliable transducer capable of withstanding stresses in excess of 7,000 p.s.i. and will not deteriorate with time or exposure to the elements. The energy of the piezoelectric crystal is continuously available as long as potential mechanical excitement is present. In addition, the crystal is stable with temperature changes and is resistant to oil and grime and so may be used under a wide range of conditions. The transmission of the high frequency signal requires only a short antenna and any transmitted signal may be picked up at a remote location, for example, by a receiver in a locomotive or at any track side station. The radio frequency energy may be modulated at a fixed frequency and provides a simple means of differentiating between true alarms and unwanted signals or static noises.

The apparatus may be economically procured and installed and no demands are made for maintenance of inspection other than that which is normally provided the bearing and journals with which the apparatus is associated. The absence of complicated electrical circuits and moving parts makes the system and apparatus reliable.

It will be apparent to one skilled in the art that the basic system and apparatus herein disclosed may be modified without departing from the spirit and scope of the invention. For example, the mechanical lever acting on the piezoelectric crystal may be of tuned-fork type which vibrates at a given frequency upon excitement. Similarly, the lever virbration may be actuated by the rotation of a shaft or an axle or an eccentricity thereon. The spark gap may be modified by the incorporation of a tuning circuit to produce a fixed frequency or the basic crystal oscillation may be amplified or changed through the use of a transistorized circuit or a transformer. It will be appreciated, however, that in the interest of economy and durability, especially when used in conjunction with railway car bearings, the simple basic system and apparatus disclosed herein is to be preferred.

It will be further apparent that the apparatus and method of the present invention may be used in conjunction with any bearing on a moving shaft and are not restricted to railway car wheel bearings. Shaft and bearing combinations on, for example, electric motors, compressors, marine engines and the like may also be usefully protected by means of the device of the invention. Similarly, the apparatus and method may be usefully employed to provide an alarm signal against, for example, unlawful entry into premises by locating the apparatus adjacent to entrances, walkways, fences and the like where mechanical movement may be created. The tampering with vaults, strong rooms and the like may also be granted against by locating in contact therewith an apparatus of the present invention.

What we claim is:

1. A device for detecting and signaling the heat condition of a machine element comprising in combination an actuating means in indirect heat-conductive contact with said machine element; a fusible retaining means adapted to hold said actuating means in a non-actuating position and in direct contact with said machine element in heat-conductive relationship; and electrical energy generating means in contact with said actuating means and actuated thereby; a radio frequency energy generating means connected to said electrical energy generating means; and a radio frequency signal transmitting means connected to said radio energy generating means; and being adapted to transmit its signal to a receiving means remote therefrom.

2. A device as claimed in claim 1 wherein the actuating means is an oscillating element.

3. A device as claimed in claim 1 wherein the electrical energy generating means is a synthetic piezoelectric crystal transducer.

4. A device claimed in claim 1 wherein the radio frequency energy generating means is a spark gap.

5. A device as claimed in claim 1 wherein the signal transmitting means is an antenna.

6. A device as claimed in claim 1 wherein the signal transmitting means is an electrical conductor.

7. A device as claimed in claim 1 wherein the machine element is a railway car journal bearing.

References Cited by the Examiner

UNITED STATES PATENTS

| | | | |
|---|---|---|---|
| 1,920,296 | 8/1933 | Coleman | 310—8.7 |
| 2,114,762 | 4/1938 | Edmonds | 73—358 |
| 2,552,165 | 5/1951 | Fritzinger | 246—169 |
| 3,211,949 | 10/1965 | Slaymaker et al. | 310—8.7 |

LOUIS R. PRINCE, *Primary Examiner.*

N. B. SIEGEL, *Assistant Examiner.*